(12) United States Patent
Roy

(10) Patent No.: US 9,630,549 B2
(45) Date of Patent: Apr. 25, 2017

(54) MULTI POINT ATTACHMENT TIE-DOWNS OF EPDM MATERIALS

(71) Applicant: René Roy, St. Johnsbury, VT (US)

(72) Inventor: René Roy, St. Johnsbury, VT (US)

( * ) Notice: Subject to any disclaimer, the term of this patent is extended or adjusted under 35 U.S.C. 154(b) by 0 days.

(21) Appl. No.: 14/718,410

(22) Filed: May 21, 2015

(65) Prior Publication Data

US 2015/0336499 A1    Nov. 26, 2015

Related U.S. Application Data

(60) Provisional application No. 61/997,130, filed on May 23, 2014.

(51) Int. Cl.
*B60P 7/08* (2006.01)

(52) U.S. Cl.
CPC .................................. *B60P 7/0823* (2013.01)

(58) Field of Classification Search
CPC ...................................................... B60P 7/0823
USPC .......... 410/97, 100, 117, 118; 152/218, 231, 152/233; 24/300, 301; 248/499
See application file for complete search history.

(56) References Cited

U.S. PATENT DOCUMENTS

| 1,651,512 | A | 12/1927 | Collins |
| 1,885,603 | A | 11/1932 | Johnson |
| 4,130,155 | A | 12/1978 | Barnett et al. |
| 4,142,808 | A | 3/1979 | Mueller et al. |
| 4,173,244 | A | 11/1979 | Schultz |
| 4,185,674 | A | 1/1980 | Giannone |
| 4,237,951 | A | 12/1980 | Dirks |
| 4,266,593 | A | 5/1981 | Hayashi |
| 4,306,602 | A | 12/1981 | Nestlen |
| 4,324,278 | A | 4/1982 | Guenther |
| 4,392,521 | A | 7/1983 | Giannone |
| 4,573,842 | A * | 3/1986 | Mantela et al. ................. 410/23 |
| 4,676,608 | A | 6/1987 | Faubion |
| 4,799,522 | A | 1/1989 | Ilon |
| 4,900,204 | A | 2/1990 | Summers |
| 5,253,393 | A * | 10/1993 | Levin .......................... 248/205.5 |
| 5,284,196 | A | 2/1994 | Nielsen |
| 5,785,783 | A | 7/1998 | Thioliere |
| 5,804,001 | A | 9/1998 | Christian |
| 6,026,876 | A | 2/2000 | Snyder |
| 6,085,816 | A | 7/2000 | Clark et al. |
| 6,152,664 | A * | 11/2000 | Dew et al. .................... 410/100 |
| 6,530,406 | B1 | 3/2003 | Gentry |
| 6,702,533 | B1 | 3/2004 | Williams et al. |
| 8,453,690 | B2 | 6/2013 | Moore |
| 2008/0245458 | A1 * | 10/2008 | Langue et al. ................. 152/218 |
| 2011/0005041 | A1 * | 1/2011 | Gangakhedkar et al. ...... 24/302 |

\* cited by examiner

*Primary Examiner* — Stephen Gordon
(74) *Attorney, Agent, or Firm* — Davis & Bujold PLLC; Michael J. Bujold

(57) ABSTRACT

A multipoint tie-down formed of EPDM for reducing movement of a load. The tie-down comprises a central hub having a plurality of elongate arms that are molded from EPDM as a single unit with the central hub. The plurality of elongate arms are elastomeric and extend from the central hub to form one of a cross-pattern, a Y-pattern and an X-pattern together with the central hub.

12 Claims, 8 Drawing Sheets

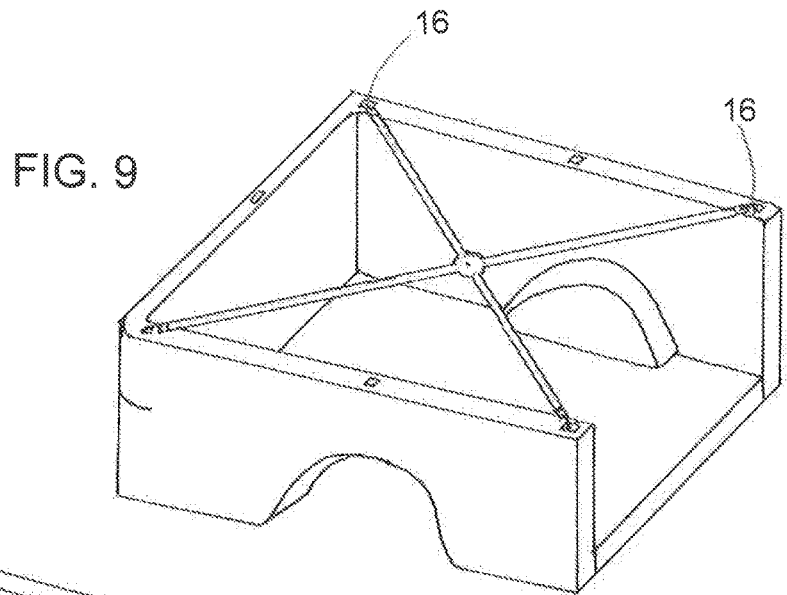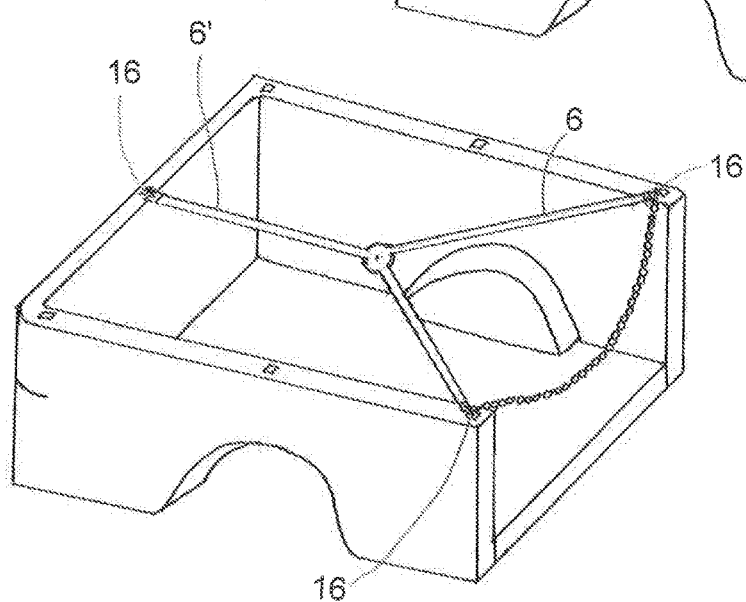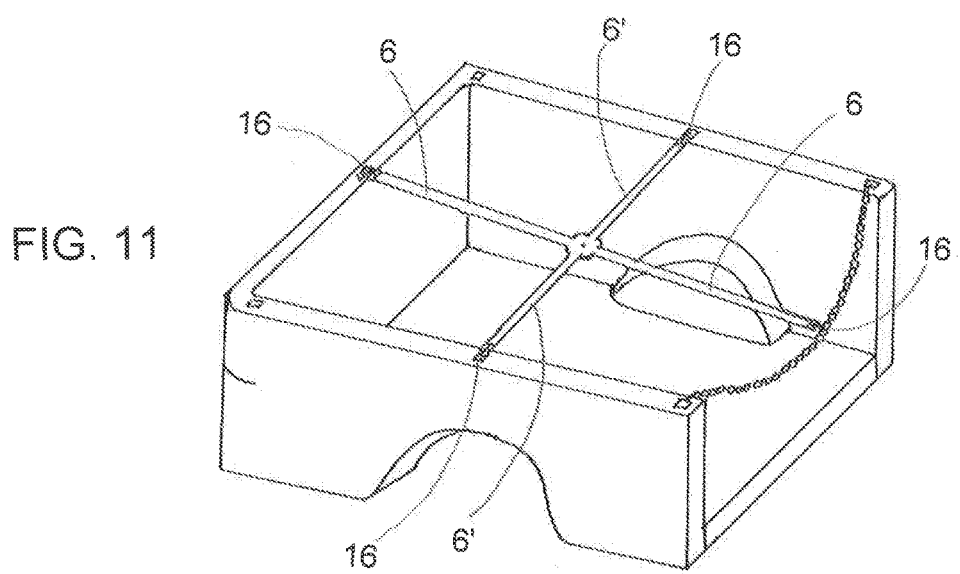

MULTI POINT ATTACHMENT TIE-DOWNS OF EPDM MATERIALS

This application claims priority from U.S. provisional patent application No. 61/997,130 filed May 23, 2014.

FIELD OF THE INVENTION

The present invention relates to multipoint attachment tie-downs and more particularly to cargo tie-downs which are especially useful in connection with the securing of the cargo loads located upon or within truck beds, flat bed trailers, roof racks, utility trailers, ATV's rear and front racks, tire chains on tractors, four wheelers, lawn mowers and any yard vehicle requiring ring chains for better traction on muddy, ice and/or snow conditions.

BACKGROUND OF THE INVENTION

Multipoint attachment tie-downs were created to alleviate the usage of many one single point attachment tie-downs. For example, the use of multi-units of a single arm tie-down promote an unequal tension from different point of attachment, thus creating tension gap and allowing for potential load shifting while in transit.

Various conventional or prior art cargo tie-downs or securing systems and or techniques are well known.

One conventional cargo tie-downs is know from U.S. Pat. No. 6,702,533. Another tie-down is known from U.S. Pat. No. 4,900,204 in which an elastic spider web shape devices for restraining cargo located in the bed of a truck or trailer are disclosed. These devices are desirable within restricted usage and limited in their usage for securing loads from shifting.

There are numerous models of tie-downs associated and used in the transport of cargo loads. Single rope crisscrossing back and forth, single EPDM tie-downs and netting are but a few examples. None of these methods have the ability to equalize the tension on all points of attachment when in use.

Tie-downs can also be beneficial for retaining chains on tires such as when chains are mounted on tires to enhance travel over muddy, snowy or otherwise slippery terrain. There are several known designs of tire chain tie-downs having various and complex mechanisms for adjusting the tension on chains and typically require several parts thus making them difficult to install. Further, the tension on the chain is controlled by some form of lock or device which are added items. A tire chain tightening apparatus and method is disclosed in U.S. Pat. No. 5,284,196 and has a complex construction of a deicing liquid dispenser with a deicer valve adjustment. The complexity of this invention is in the installations, metering of liquid deicer which make the cost of the apparatus quite expensive.

Other chain tightening devices are known from U.S. Pat. No. 4,130,155 to Barnett et al., U.S. Pat. No. 4,142,808 to Muller et al, and U.S. Pat. No. 4,306,602 to Nestlen that are installed between the links of the chains. One problem often associated with such devices includes the addition of extra weight to the chain at different locations thus creating an uneven weight distribution around the chain. This uneven weight distribution creates the condition of an unbalanced wheel. U.S. Pat. No. 5,284,196 discloses a special hand tool that is used in the installation of tire chains. The complexity of tire chain installation can promote confusion and may cause faulty installation of the these tire chain devices.

U.S. Pat. No. 1,885,603 shows a chain tightener that has a locking mechanism. The additional mechanism which locks the tightened chain includes additional moving parts which can release or unlock thus causing one or more of the attachments to come loose which can result in the chain becoming unbalanced especially if the other locks remain secured.

U.S. Pat. No. 8,453,690 describes a tire chain tightener that is installed in a complex number of sequential steps. The installation of such a tire chain tightener can be time consuming especially if one step of the installation missed. If this is the case the remedial action is to start over.

Other know devices are known from U.S. Pat. No. 1,651,512 which discloses a tire-chain locking tightener, U.S. Pat. No. 6,530,406 which discloses a chain tightening apparatus having several parts. U.S. Pat. No. 4,324,278 describes a tire chain system having multiple parts and requiring assembly and which has individual tensioning gadgets for each section of chain.

Further known devices for increasing the tension on such chains are described for example in U.S. Pat. Nos. 4,173,244; 4,185,674; 4,237,951; 4,266,593; 4,392,521; 4,676,608; 4,799,522; 5,284,196; 5,785,783; 5,804,001; 6,026,876; and 6,085,816, the disclosures of which are incorporated herein by reference. Many of these chain tightening devises are extremely complex, difficult to install and expensive.

Consequently, a need still exists in the art for a new and improved cargo tie-down system and technique which is especially adapted for use in connection with the tying-down or securing cargo loads to a support system such as freight carriers, pick-up trucks, flat bed trailers, car carriers, utility trailers, vehicle roof top racks, ATV rear and front racks, and securing tire chains on home and farm tractors, ATVs, lawn mowers and other yard vehicles that require chains for moving on ice, mud or other difficult surfaces.

SUMMARY OF THE INVENTION

Wherefore, it is an object of the present invention to overcome the above mentioned shortcomings and drawbacks associated with the prior art.

Another object of the present invention is to provide multipoint attachment tie-downs which respond dynamically to evenly distribute tension from all points at which the multipoint attachment tie-down is secured.

A further object of the present invention is to provide a multipoint attachment tie-down design having a built in hub which has the advantage of distributing and self adjusting tension from all points at which the multipoint attachment tie-down is secured.

Yet another object of the present invention is to provide a simple to manufacture rubber elastic multipoint attachment tie-down of EPDM material.

A still further object of the present invention is to provide a tie-down having multipoint attachments which receive a galvanized "S" hook at each end of an arm or point of attachment thereof. The tie-down having a central hub where the arms are connected and which equalizes the tension on all points of attachment.

Another object of the present invention is to provide multipoint attachment tie-down configurations that secure various types of domestic and commercial loads to support systems such as on trailers, pickup truck beds, vehicle roof racks, car carriers, ATVs rear and front carriers, freight carriers, flat bed trailers and utility trailers.

Yet another object of the present invention is to provide multipoint attachment tie-down configurations that secure chains to tires and prevents the chains from shifting on the tires of vehicles such has farm tractors, cars, trucks, home and garden tractor and ATVs and can also be used on stationary platforms to secure various applications such as tarps, canvasses, plastic coverings.

A still further object of the present invention is to provide a multipoint attachment tie-down designed to alleviate areas of tension by pulling evenly in all directions after the "S" hooks are secured at different attachment points while at the same time eliminate the potential slack caused when loads shift in relation to the support systems. In the case of tire chains, these multipoint attachment tie-downs provide a constant tension on the tire chains to secure the chains to the tires of a vehicle and remove the slack in the chains, stopping the shifting often caused by loose chains.

Another object of the present invention is to provide a multipoint attachment tie-down that comprises an EPDM material which, when stretched has a memory factor that provides equal tension on all points of attachment. Unlike a tether which has only two points of attachment, the multipoint attachment tie-downs according to the invention have multidirectional points of attachment. Therefore, the need for additional tensioning devises or tie down units is eliminated. The EPDM rubber like material has a memory recall and will self adjust after tension is created when the arms are secured.

Another object of the invention is to provide multi-point attachment tie-downs designed to alleviate slack caused by load shifting and which are inexpensive and provide a safe and easy installation and removal of the same.

The present invention also relates to a multipoint tie-down formed of EPDM for reducing movement of a load. The tie-down comprising a central hub having a plurality of elongate arms that are molded from EPDM as a single unit with the central hub. The plurality of elongate arms are elastomeric and extend from the central hub to form one of a cross-pattern, a Y-pattern and an X-pattern together with the central hub.

The present invention also relates to a multipoint tie-down formed of EPDM for reducing movement of a load. The tie-down comprises a central hub having a plurality of elongate arms that are molded from EPDM as a single unit with the central hub. The central hub has a center point and a perimeter, the center point of the hub has a greater thickness dimension than a thickness dimension of the perimeter of the hub. The plurality of elongate arms are elastomeric and each of the plurality of elongate arms can stretch between an extended condition when tension is placed thereon and a relaxed condition when the elastic arm is free from tension. Each of the elongate arms comprises a remote end. A connector is received within the thru-hole and secured to the remote end of the elongate arm by way of a friction fit with the thru-hole.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. The invention will now be described, by way of example, with reference to the accompanying drawings in which:

FIG. 9 is a perspective view of the four point attachment tie-down having the "X" pattern according to FIG. 1 attached to a support system of a pick-up truck bed;

FIG. 10 is a perspective view of the three point attachment tie-down having the "Y" pattern according to FIG. 2 attached to a support system of a pick-up truck bed;

FIG. 11 is a perspective view of the four point attachment tie-down having the "cross" pattern according to FIG. 3 attached to a support system of a pick-up truck bed.

DETAILED DESCRIPTION OF THE PREFERRED EMBODIMENTS

The present invention will be understood by reference to the following detailed description, which should be read in conjunction with the appended drawings. It is to be appreciated that the following detailed description of various embodiments is by way of example only and is not meant to limit, in any way, the scope of the present invention.

Figure 1:
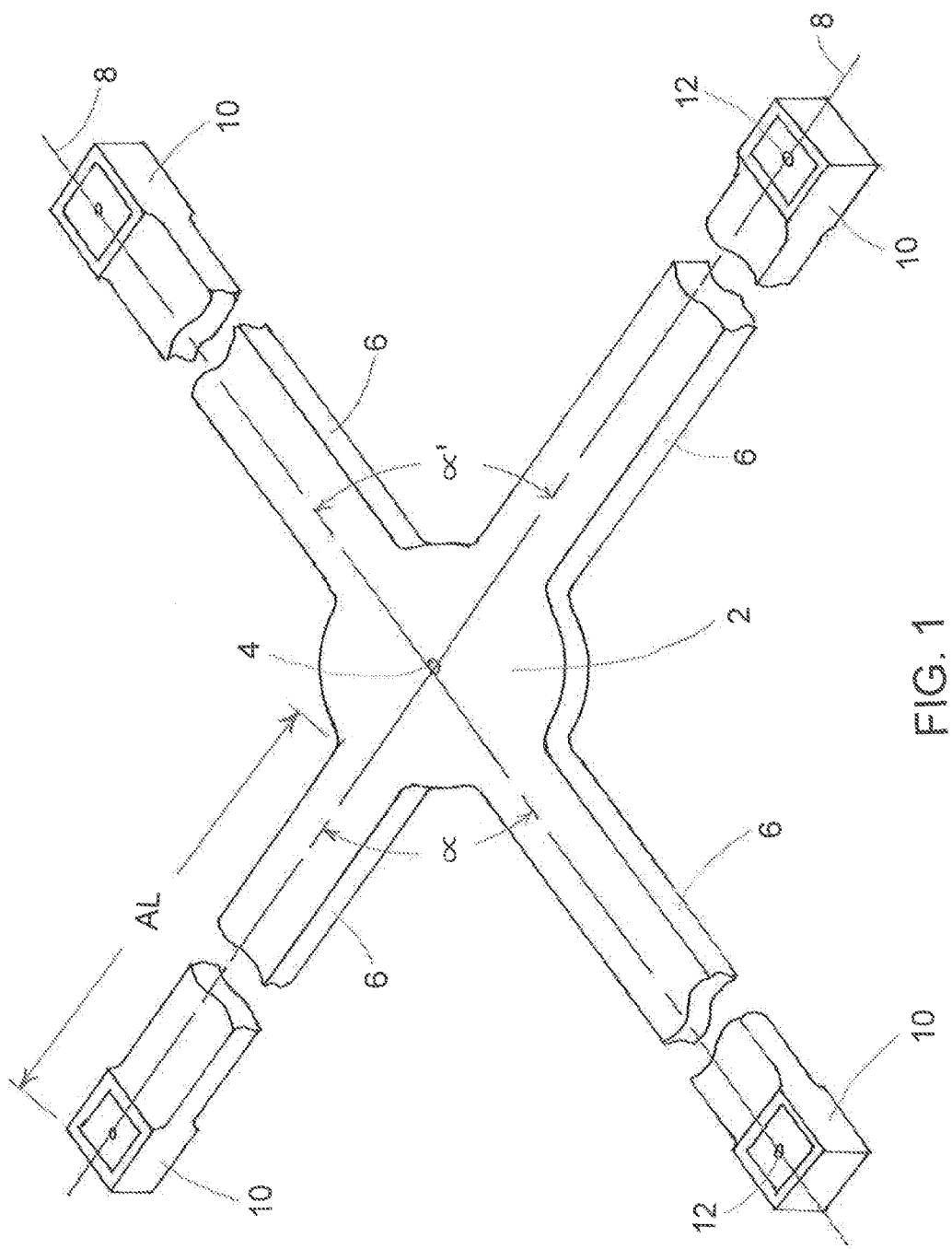
FIG. 1 is a perspective view of an embodiment of a multipoint attachment tie-down according to the invention having an "X" pattern.
Figure 2:
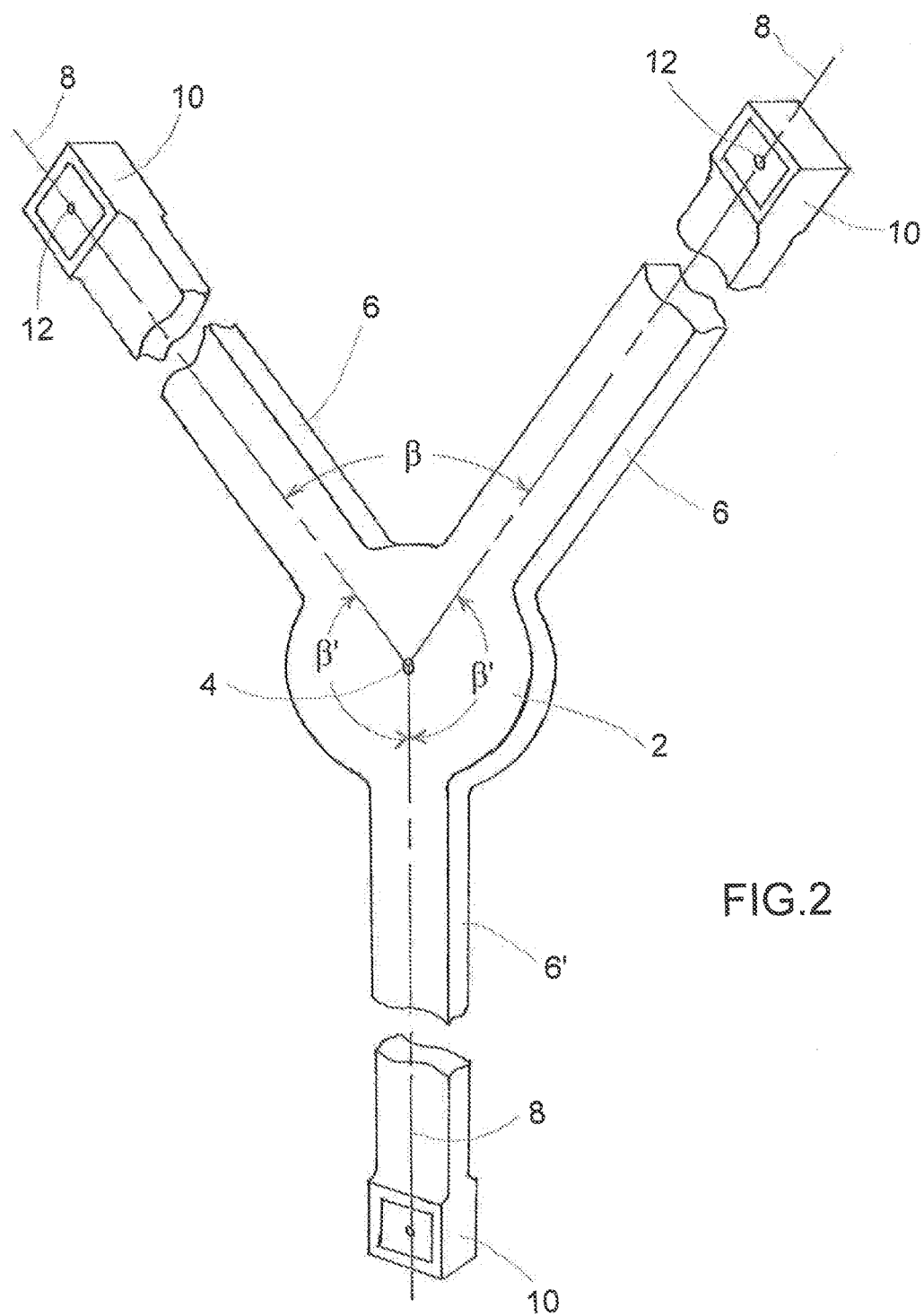
FIG. 2 is a perspective view of a central hub of another embodiment of a multipoint attachment tie-down according to the invention having a "Y" pattern.
Figure 3:
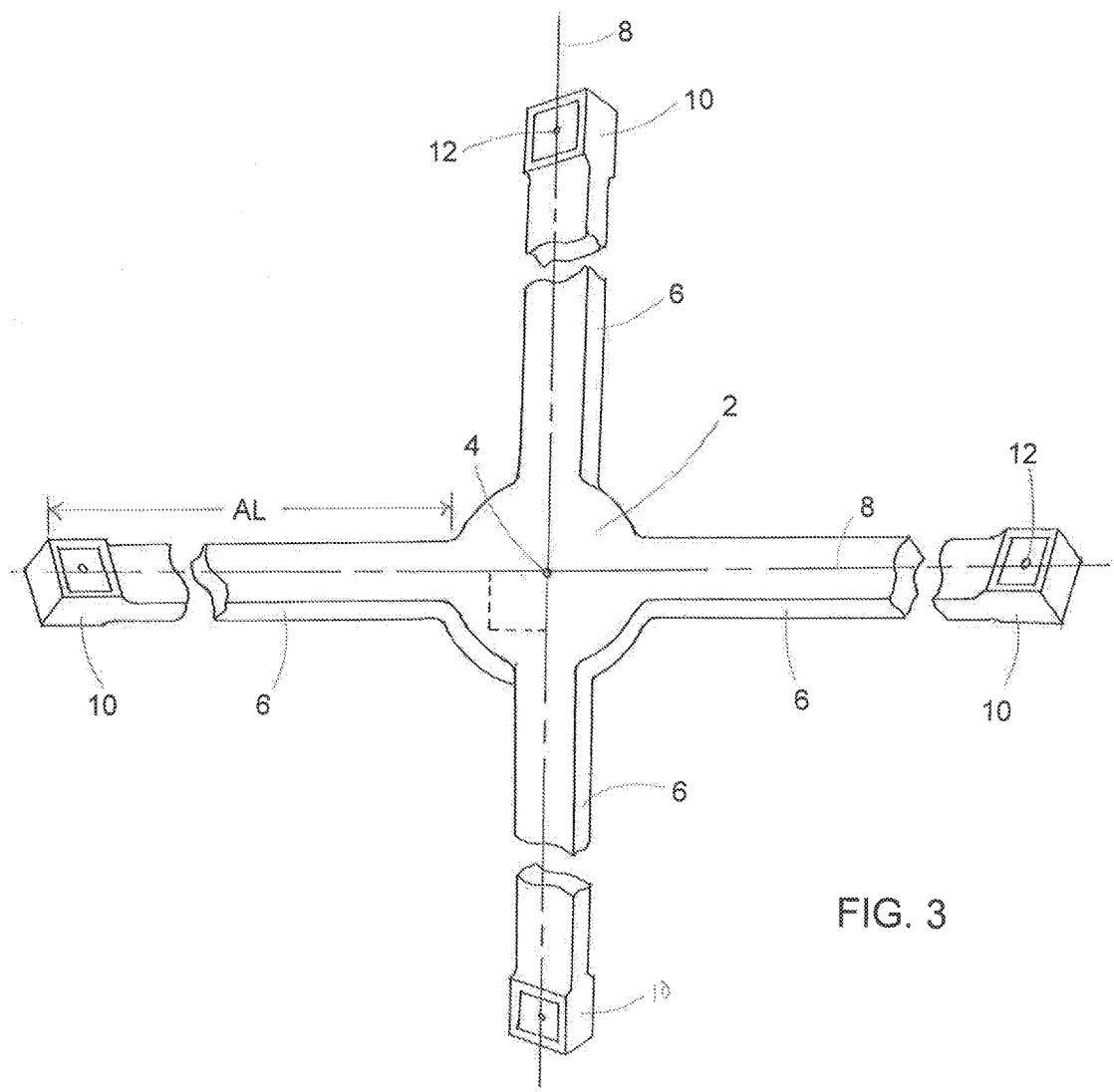
FIG. 3 is a perspective view of a further embodiment of a multipoint attachment tie-down according to the invention having a "cross" pattern.
Figure 7:
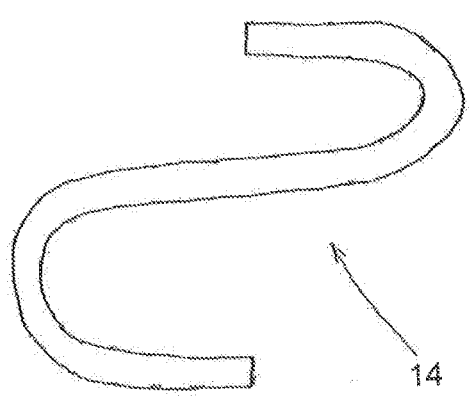
FIG. 7 is a detailed view of a galvanized "S" hook.
Figure 8:
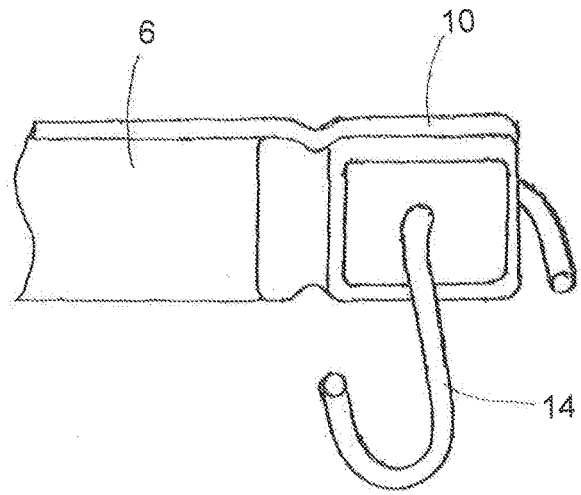
FIG. 8 is a perspective view of the knob at the remote end of a stretchable arm of a multipoint attachment tie-down according to the invention with the galvanized "S" hook secured thereto.

Turning now to FIGS. 1-3, a brief description concerning the various components of the present invention will now be briefly discussed. As can be seen in these embodiments, each multi-point attachment tie-down has a central portion including a central hub 2 that is generally circular in shape and has a center point 4. The central hub 2 is formed so as to have a number of elongate arms 6 that extend radially outwardly from the central hub 2. The tie-downs shown in FIGS. 1 and 3 each have four elongate arms 6, while the tie-down shown in FIG. 2 has three elongate arms 6. Each of the elongate arms 6 defines an axis 8 and is aligned with respect to the central hub 2 such that the axes 8 of the elongate arms 6 intersect each other at the center point 4 of the central hub 2. Each elongate arm 6 has an end 10 that is remote from the central hub 2 and comprises a thru-hole 12. A connector 14 (FIG. 7) is coupled to the remote end 10 of the elongate arms 6, as shown in FIG. 8 such that the tie-downs are useful in connection with the securing of loads in relation to a support structure. For example, the tie-downs are especially beneficial in securing loads on or within the support systems of trucks, pick-up beds, utility trailers, car roof racks, ATVs rear and front carrying racks for example. The tie-downs are also useful for applying tension on wheel chains to prevent shifting movement of the chain on the wheels of a vehicle, e.g., the wheels of trucks, cars, home and garden tractors, lawn mowers, and ATV's to name a few.

The central hub 2 and the elongate arms 6 of the tie-downs are formed so as to be integral with each other. Preferably the central hub 2 and the elongate arms 6 are formed as a single component from an elastic material. For example the central hub 2 and elongate arms 6 are molded from ethylene propylene diene monomer rubber (EPDM). Although any number of different elastic materials can be used to form the tie-downs, a high grade weather resistant EPDM material is preferred for forming the tie-downs because of the benefits associated with its mechanical and thermal properties as discussed below.

Figure 4:
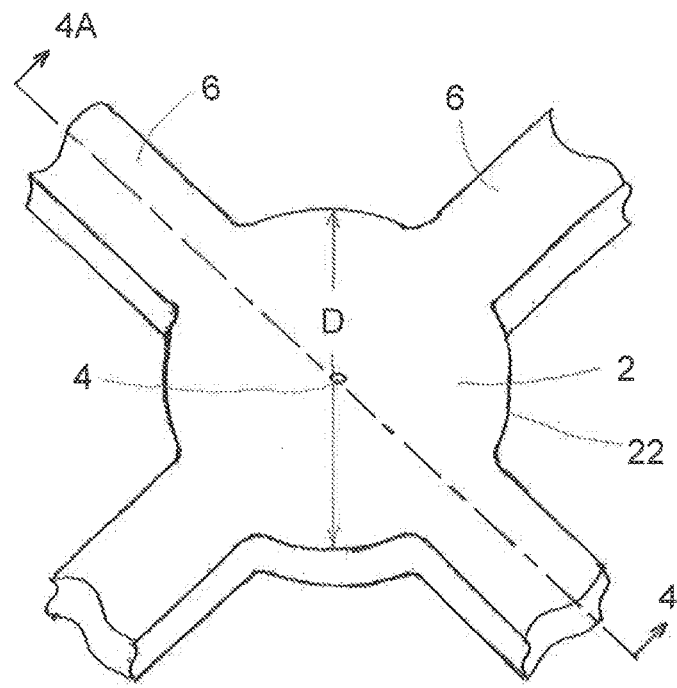
FIG. 4 is a perspective view of central hub at inner ends of stretchable arms of a multipoint attachment tie-down according to the invention.
Figure 4A:
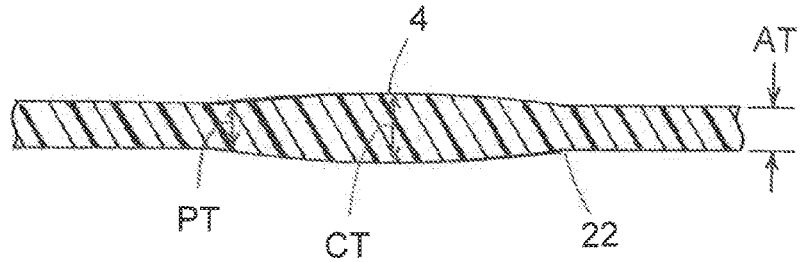
FIG. 4A is a cross section view of the central hub at inner ends of the stretchable arms of a multipoint attachment tie-down according to the invention viewed along section line 4A-4A of FIG. 4.
Figure 4B:
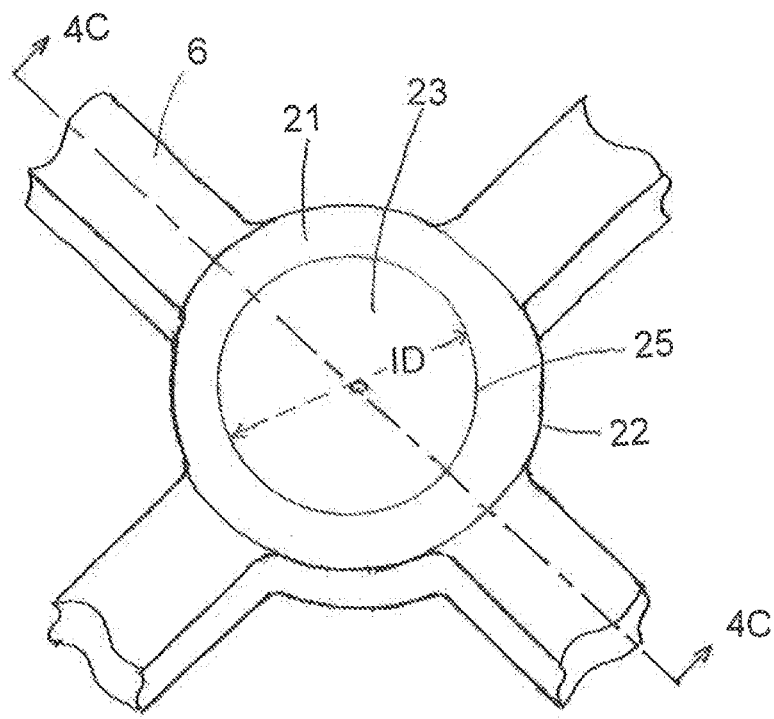
FIG. 4B is a perspective view of another embodiment of the central hub at inner ends of stretchable arms of a multipoint attachment tie-down according to the invention.
Figure 4C:
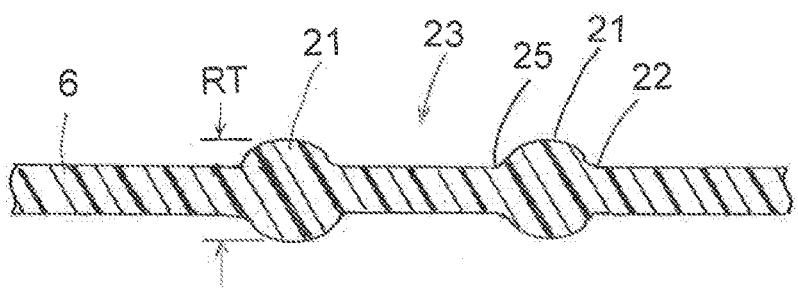
FIG. 4C is a cross section view of the central hub at inner ends of the stretchable arms of a multipoint attachment tie-down according to the invention viewed along section line 4C-4C of FIG. 4B.

FIGS. 4-4C illustrate the central hub 2 of a multipoint attachment tie-down. The central hub 2 has an outer perimeter profile that is generally circular in shape, however it is to be recognized that the outer perimeter profile of the central hub 2 can be formed in other shapes. The central hub 2 allows the tie-down to be stretched to almost one third longer then the actual measurements of the tie-down. The central hub 2 also facilitates maintaining and distributing an equal amount of tension between the elongate arms 6, and thus to all the points at which the tie-down is attached (attachment points 16), so as to secure the load evenly and reduce shifting or movement of the load. When used in conjunction with tire chains 18 (see FIGS. 12A-12C), the tie-down helps keep the chains 18 snug on the tire 20 and reduce the risks of chain rolling and/or coming off the tires 20 because of the equalized tension created by the central hub 2 and the ability of the elongate arms 6 to stretch and return to evenly distributed tension.

The central hub 2 of the tie-down has an outer diameter D of between 1 inch and 3.5 inches or preferably the central hub 2 has an outer diameter D that is approximately 2 inches to 2.75 inches and most preferably the outer diameter of the central hub is 2.5 inches. The central hub 2, as illustrated in FIGS. 4 and 4A, has a material thickness that tapers from the center point 4 of the hub 2 to the periphery 22 of the hub. The center point thickness CT (FIG. 4A) of the central hub 2 is between ¾ inch and ⅜ inch. Preferably the center point thickness CT of the central hub 2 is approximately ½ inch. The thickness PT at the periphery 22 of the central hub 2 is between ⅜ inch and ⅛ inch. Preferably the thickness PT at the periphery 22 of the central hub 2 is approximately ¼ inch.

In another embodiment as shown in FIGS. 4B and 4C, the central hub 2 has a ring shaped portion 21 located within the periphery 22 of the hub 2. The ring shaped portion 21 has an annular inner edge 25 and a somewhat greater material thickness RT than the elongate arms 6 and an interior portion 23 of the central hub 2, i.e. the portion of the central hub 2 that is within the inner edge 25 of the ring shaped portion 21. The ring shaped portion 21 adds strength to the central hub 2 and assists with maintaining and distributing an equal amount of tension between the elongate arms 6 and thus to all the points 16 at which the tie-down 2 is attached (FIGS. 9-12C), so as to secure a load evenly and reduce shifting or movement of the load in relation to the support system of a truck bed for example.

The central hub 2 of the tie-down has an outer diameter D (FIG. 4) of between 1 inch and 3½ inches or preferably the central hub 2 has an outer diameter D that is approximately 2 inches to 2¾ inches and most preferably the outer diameter of the central hub is 2½ inches. The diameter ID of the inner edge 25 of the ring shaped portion 21 of the central hub 2, is slightly smaller than the outer diameter and, generally, the inner diameter ID of the shaped portion 21 is approximately between 2¼ inches and 1¾ inches and more preferably the inner edge 25 of the ring shaped portion 21 has a diameter of approximately 2 inches. The material thickness RT of the ring shaped portion 21 of the central hub 2 is greater than the material thickness of the interior portion 23 of the central hub 2. The material thickness RT of the ring shaped portion 21 is generally between ¾ inch and ⅜ inch. Preferably the thickness RT of the ring shaped portion 21 is approximately ½ inch. The material thickness of the interior portion 23 of the central hub 2 (FIG. 4B, 4C) is generally the same as the thickness PT at the periphery 22 of the central hub 2, e.g., at least approximately ¼ inch.

Figure 5:
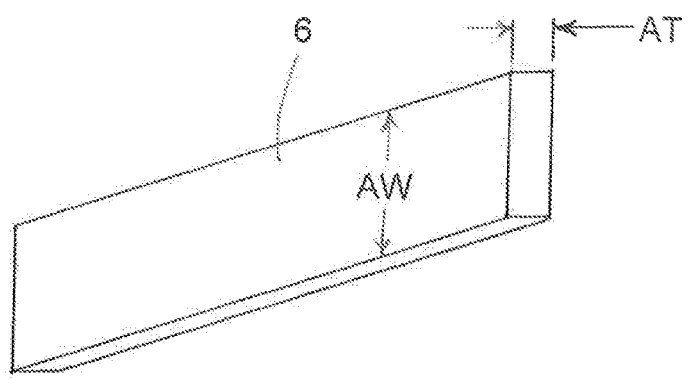
FIG. 5 is a perspective view of a portion of a stretchable arm of a multipoint attachment tie-down according to the invention
Figure 5A:
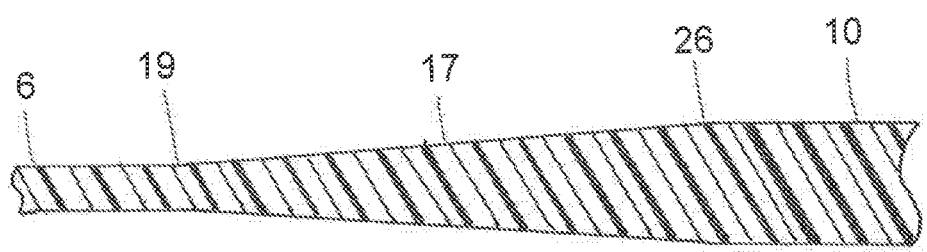
FIG. 5A is a sectional view of a portion of a stretchable arm including the remote end thereof according to the invention.

Portions of elongate arms 6 of the tie-downs are shown in FIGS. 5 and 5A. As the elongate arms 6 and the central hub 2 are formed together from the EPDM material, the arms 6 can be stretched up to two times their original length.

Figure 12B:
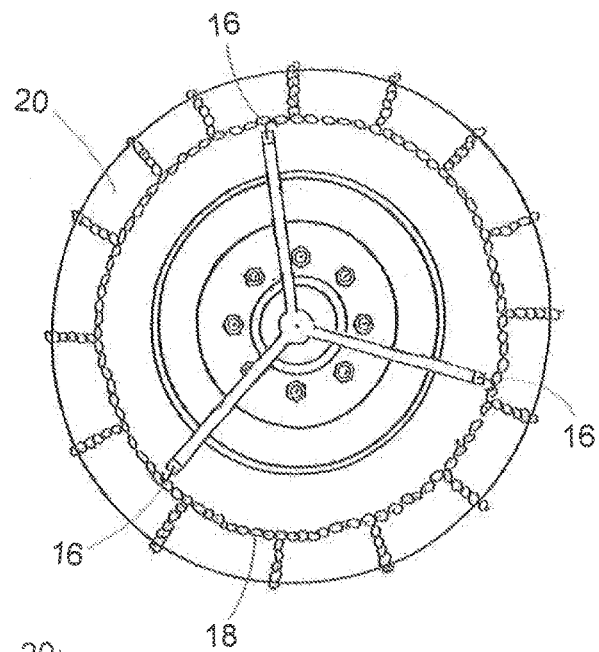
FIG. 12B is a perspective view of the three point attachment tie-down having the "Y" pattern according to FIG. 2 securing a conventional tire chain arrangement to a tire of a vehicle
Figure 12A:
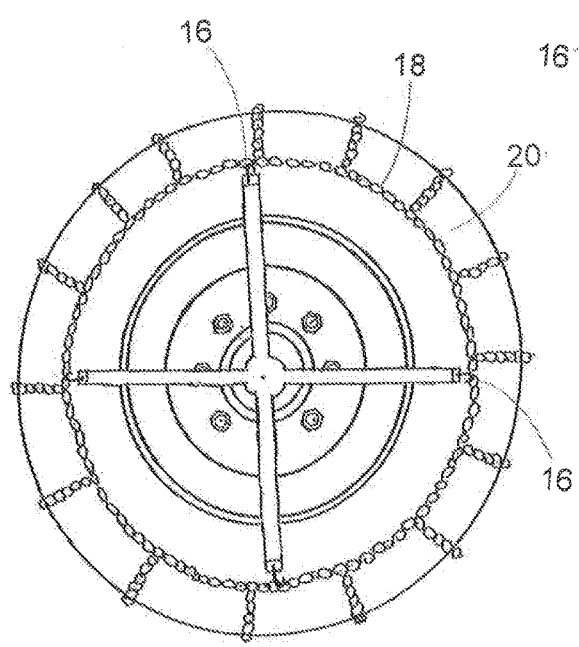
FIG. 12A is a perspective view of the four point attachment tie-down having the "X" pattern according to FIG. 1 securing a conventional tire chain arrangement to a tire of a vehicle.
Figure 12C:
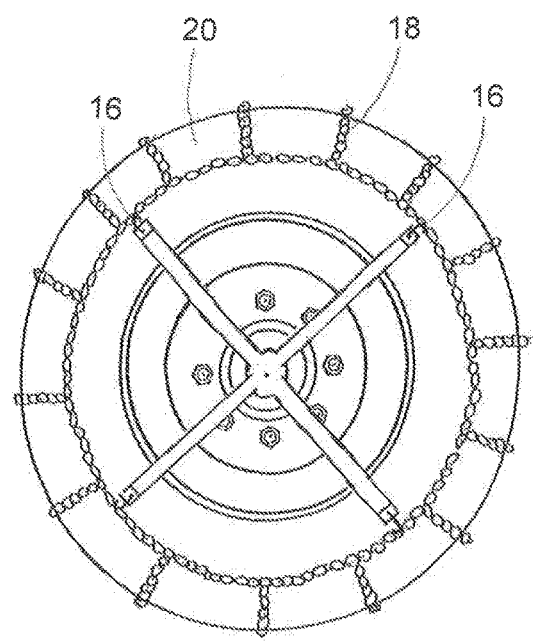
FIG. 12C is a perspective view of the four point attachment tie-down having the "cross" pattern according to FIG. 3 securing a conventional tire chain arrangement to a tire of a vehicle It should be understood that the drawings are not necessarily to scale and that the disclosed embodiments are sometimes illustrated diagrammatical and in partial views. In certain instances, details which are not necessary for an understanding of this disclosure or which render other details difficult to perceive may have been omitted. It should be understood, of course, that this disclosure is not limited to the particular embodiments illustrated herein.

As shown in FIG. 5, generally the width AW of the elongate arms 6 is between 1¼ inches and ⅝ inch. Preferably the width AW of the elongate arms 6 is approximately ¾ inch. The elongate arms 6 generally have a material thickness AT that is substantially the same as the thickness PT at the periphery 22 of the central hub 2. That is to say the thickness AT of the elongate arms 6 is between ⅛ inch and ⅜ inch. Preferably the thickness AT of the elongate arms 6 is approximately ¼ inch. FIG. 5A shows another embodiment of the elongate arm. In the cross section view of this embodiment, the elongate arm 6 has transition section 17 that extends along a portion of the length of the elongate arm 6 adjacent the remote end 10 thereof. The transition section 17 of the elongate arm 6 has a first end 19 that directed toward the central hub 2 and a second end 26 that is remote from the central hub 2. The transition section 17 of the elongate arm 6 is integrally formed with the remote end 10 of the elongate arm 6, and, via an inner section of the arm, with the central hub 2. The transition section 17 is delimited by an increasing material thickness from the first end 19 to the second end 26 thereof. That is to say, the material thickness at the first end of the transition section is the same as the material thickness AT of a remainder of the elongate arm 6 while the material thickness of the transition section 17 at the second end 26 is the same as the material thickness ET of the remote end 10 as shown in FIG. 6A. The upper and lower surfaces of the elongate arm 6 are angled away from each other over the course of the transition section 17 from the first end 19 to the second end 26, whereas the upper and lower surfaces of the elongate arm 6 are otherwise substantially parallel with respect to each other. The upper and the lower surfaces of the remote end 10 of the elongate arm 6 are also generally parallel with respect to each other. It is to be understood that the axial length of the transition section can vary, that is to say the angle between the upper and the lower surfaces of the transition section 17 can vary depending on a number of different factors. The length of the transition section 17 can be based on the desired strength or resistance to elasticity of the tie-down or rather the overall length of the tie-down and thus the length of the individual elongate arms 6. The length of the arms 6 of the tie-down may either be equal to each other or vary so as to accommodate different conditions and/or anticipated uses. As briefly described above, the number of elongate arms 6 formed on the central hub 2 and the location about the circumference of the central hub 2 are generally dependant on the anticipated use of the tie-down as will be described below, the same holds true for the length of the elongate arms 6 when unstretched. That is to say the length of the elongate arms 6 may vary based on its anticipated use. For example, with a tie-down having a cross pattern which is to be used in securing and tensioning tire chains 18 to the tire 20 of a vehicle, as shown in FIG. 12C, it is beneficial for the arms 6 to each have the same length. This enables the tie-down to equalize the tension applied to the chains 18 at each of the attachment points 16. The lengths of the elongate arms may also differ depending on the number of arms and the alignment of the arms with respect to each other and the central hub. For example, tie-downs having a cross pattern that are made for securing loads to a pick-up truck, it may be beneficial for two of the elongate arms 6 to have a length AL that is between 44 inches to 36 inches and two other elongate arms 6' to have a length AL of between 24 inches to 22 inches. In such a case, as shown in FIG. 11, the differing length of the elongate arms enable the tie-down to equally distribute the tension between the four sides of the truck bed. As shown, the two longer arms 6 of the tie-down would be connected to the front and rear sides of the truck bed while the two shorter arms 6' would be connected to the right and left sides of the truck bed. Generally speaking, if the central hub 2 of the tie-down is expected to be equally spaced from each of the attachment points 16, then it is beneficial for the elongate arms 6 to all have the same length AL. In view of the above the length AL of the elongate arms 6 can range between 6 inches to 44 inches or more preferably the length AL of the elongate arms 6 have a ranges of approximately 8 inches to 36 inches.

Figure 6:
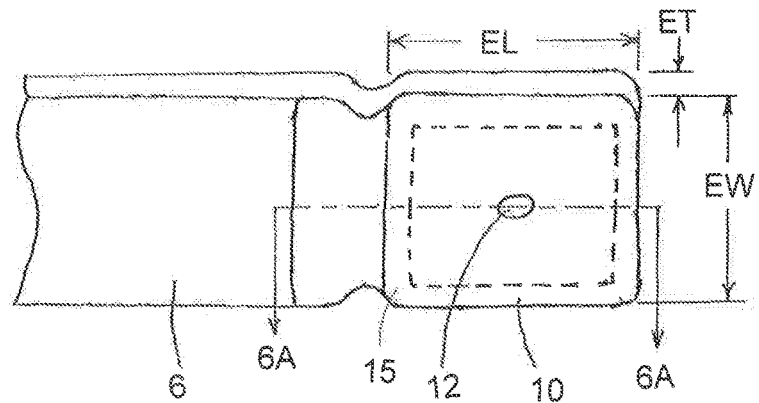
FIG. 6 is a perspective view of a knob at a remote end of a stretchable arm of a multipoint attachment tie-down according to the invention.
Figure 6A:
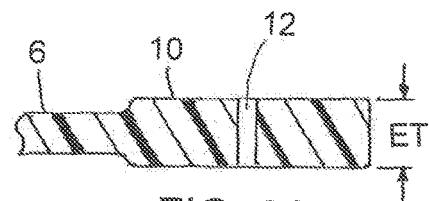
FIG. 6A is cross section view of the knob at the remote end of a stretchable arm of a multipoint attachment tie-down according to the invention viewed along section line 6A-6A of FIG. 6.
Figure 6B:
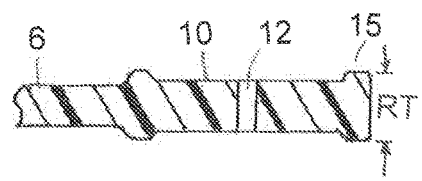
FIG. 6B is cross section view of another embodiment of the knob at the remote end of a stretchable arm of a multipoint attachment tie-down according to the invention.

FIGS. 6, 6A and 6B illustrate a remote end 10 of an elongate arms 6. The remote end 10 of the elongate arm 6 has a thru-hole 12 that is located substantially in the middle of the remote end 10. The thru-hole 12 is approximately ⅛ inch in diameter and passes completely through the remote end 10. The thru-hole 12 receives an S-hook 14 as shown in FIG. 7 and is sized to snugly couple the S-hook 14 to the tie-down by means of a friction fit. The S-hook 14 is galvanized for the purposes of strength, anti-corrosion and an all weather performance. Although other similar hooks may be utilized with the tie-down, it has been found that similar plastic hooks do not function very well in cold climates and have a tendency to become brittle and brake easily. The galvanized S-hooks 14 serve to make fastening of the tie-down to different supports quick, easy and secure. That is to say, the S-hooks 14 enable simple and secure attachment of the tie-down to the links of tire chains 18 (FIGS. 12A-12C) or attachment points 16 on a load carrier, e.g. pick-up truck (FIGS. 1-3). When the tie-down is secured, via the S-hooks 14, to the desired attachment points 16, a great deal of tension is focused in the remote ends 10 of the elongate arms 6. To offset this tension, the remote end 10 is designed to be somewhat larger in size than the elongate arm 6, i.e., the remote end 10 of the elongate arm 6 has a greater material thickness ET than the thickness AT of the elongate arm 6.

As illustrated in FIGS. 6, 6A, 6C, the remote ends 10 generally have a material thickness ET of between ⅜ inch and ¾ inch. Preferably the remote ends 10 have a thickness ET that is at least approximately ½ inch. The remote ends 10 have a width EW that is between 1¼ inches and ⅝ inch and preferably the remote ends 10 have a width EW that is approximately ¾ inch. The length EL of the remote ends 10 is between 1¼ inches and ⅝ inch and preferably the remote ends 10 have a length EL that is approximately ¾ inch.

FIG. 6B illustrates another embodiment of the remote end 10 of the elongate arms 6. As this embodiment of the remote end 10 is quite similar to the embodiment described above, only the differences of this embodiment will be described here. As can be seen in FIGS. 6 and 6A the remote end 10 has a raised border 15 on the upper and lower faces thereof. The raised border 15 of the remote end 10 has a material thickness RT that is greater than the thickness of an interior portion of the remote end 10 that is to say the portion of the remote end 10 through which the thru-hole 12 passes. The interior edge of the raised border 15 can be seen in FIG. 6 as a dashed line. The embodiment of the remote end 10 as shown in FIG. 6B is beneficial in that less material can be used when producing the tie-down without sacrificing the strength or durability of the remote end 10. The raised border 15 provides adequate strength to the remote end 10 such that when tension is placed thereon via the S-hook 14 secured within the thru-hole 12, the S-hook 14 will not damage, e.g. tear or rip through the remote end 10 of the elongate arm 6.

In this embodiment, the raised border 15 generally has a material thickness RT of between ⅜ inch and ¾ inch or preferably the raised border 15 has a thickness RT that is approximately ½ inch. The interior portion of the remote end 10 has a thickness that is at least substantially the same as the thickness of the arm 6 as described above. Otherwise the length and width dimensions of the remote end 10 according to this embodiment are the same as the length and width dimensions of the remote end illustrated in FIG. 6.

The embodiments of the multi-point tie-downs as shown in FIGS. 1-3 are substantially the same with the only difference being the number and arrangement or alignment of elongate arms 6 on the central hub 2. The tie-down as illustrated in FIG. 1 has four elongate arms 6 arranged in the form of the "X" pattern and is particularly useful in applications having four points of attachment such as at the corners of a rectangular load carrier, e.g. pick-up truck as shown in FIG. 9. This four point tie-down is also shown in FIG. 12A as being used for maintaining the position of chains 18 on a tire 20. In this embodiment, the axes 8 of all the elongate arms 6 pass through the center point 4 of the central hub 2 and extend such that, as viewed in FIGS. 1 and 9 a right hand pair of arms 6 extends opposite to a left pair of arms 6. To equally distribute tension between the four corners of a rectangular load carrier, the angle α between the axes of left pair of elongate arms 6 is equal to the angle α' between the axes of the right pair of elongate arms and both of these angles are in a range of 55 degrees to 85 degrees. Preferably the angles α, α' are at least approximately 70 degrees.

The tie-down as illustrated in FIG. 2 has three elongate arms 6 arranged in the form of a "Y" pattern and which is particularly useful in applications having three points of attachment such as a rectangular load carrier, e.g. pick-up truck (see FIG. 10). This three point tie-down is also shown in FIG. 12B as being used for maintaining the position of chains 18 on a tire 20. In the illustration of FIG. 10, two of the points of attachment are located at the rear corners of the truck bed while a third point of attachment is located centrally between the front corners of the truck bed. Similarly to the tie-down described above, the axes 8 of all the elongate arms 6 pass through the center point 4 of the central hub 2. However the two rearward extending arms are arranged such that their axes form an angle β that is smaller than the angle β' formed between the axes 8 of the rearward extending arms 6 and the axis of the forward extending arm 6'. The angle β formed by the axes 8 of the two rearward extending arms 6 is in a range of 60 degrees to 80 degrees and preferably, the angle β formed by the axes 8 of the two rearward extending arms 6 is approximately 70 degrees. An extension of the axis 8 of the forward extending arms 6' at least approximately bisects the angle β formed by the axes 8 of the two rearward extending arms 6. Put in another way, the angle β ' formed between the axis 8 of the one of the rearward extending arms 6 and the axis 8 of the forward extending arm 6' is the same as the angle β' formed between the axis 8 of the other one of the rearward extending arms 6 and the axis 8 of the forward extending arm 6'. In this arrangement it is understood that the length of forward extending elongate arm 6' may possibly be longer than the lengths of the two rearward extending arms 6 so as to equally distribute tension between the three attachment points 16.

The tie-down as illustrated in FIG. 3 has four elongate arms 6 in the form of the "cross" pattern and is particularly useful in applications having four points of attachment such as respectively between the sides of a rectangular load carrier, e.g. pick-up truck (see FIG. 11). This four point tie-down is also shown in FIG. 12C as being used for maintaining the position of chains 18 on a tire 20. In this application the axes 8 of all the arms 6, 6' pass through the center point 4 of the central hub 2 and are at right angles with respect to each other. To equally distribute tension between the four rectangularly arranged attachment points 16, it is understood that the length of the two elongate arms 6 that are coaxially aligned with each other and extend between the front and the rear sides of the truck bed may possibly be longer than the length of the elongate arms 6' that are coaxially aligned with each other and extend laterally between lateral sides of the truck bed.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

I claim:

1. A multipoint tie-down formed of EPDM for reducing movement of a load with respect to a support system, the tie-down comprising:
   a central hub having a plurality of elongate arms that are molded from EPDM as a single unit with the central hub;
   the plurality of elongate arms are elastomeric and extend radially outward from the central hub;
   connectors are secured to the plurality of elongate arms and facilitate mounting the tie-down to the support system,
   the central hub being non-spherical and having a circular perimeter, and a material thickness of the central hub at a center point thereof is at least as great as a material thickness of the elongate arms to facilitate maintaining and distributing an at least a substantially balanced amount of tension between the plurality of elongate arms; and
   the plurality of elongate arms are stretchable when tension is placed on the multipoint tie-down, and the plurality of elongate arms are aligned with respect to each other to at least substantially balance the tension placed on the multipoint tie-down, and the material thickness of the central hub is greatest at the center point thereof and continually reduces from the material thickness at the center point to a material thickness at the perimeter of the central hub.

2. The multipoint tie-down according to claim 1, wherein the connectors are galvanized S-hooks and each of the plurality of elongate arms has a remote end that is opposite from the central hub, each of the remote ends comprises a thru-hole therein that is located centrally in the respective remote end, the thru-holes of the remote ends each receive one of the S-hooks, the S-hooks couple the multipoint tie-down to a plurality of attachment points on the support.

3. The multipoint tie-down according to claim 2, wherein each of the thru-holes of the plurality of elongate arms is approximately ⅛ inch in diameter and the galvanized S-hooks are secured in the respective thru-holes by a friction fit.

4. The multipoint tie-down according to claim 1, wherein the plurality of elongate arms of the central hub comprise first, second, third and fourth elongate arms, each of the first, the second, the third and the fourth elongate arms defines an axis and is arranged with respect to the central hub such that the axis of each of the first, the second, the third and the fourth elongate arms passes through the center point, and the first and the third elongate arms are coaxially aligned with each other and the second and the fourth elongate arms are coaxially aligned with each other, and the central hub and the first, the second, the third and the fourth elongate arms are arranged to form an X-pattern.

5. The multipoint tie-down according to claim 4, wherein an angle between the axes of the first and the fourth elongate arms is 70 degrees and equal to an angle between the axes of the second and the third elongate arms.

6. The multipoint tie-down according to claim 1, wherein the central hub is formed with first, second, and third elongate arms and comprises the center point, each of the first, the second, and the third elongate arms defines an axis, and the central hub and the first, the second, and the third elongate arms are arranged to form a Y-pattern.

7. The multipoint tie-down according to claim 6, wherein an angle formed between the axes of the first and the second elongate arms is obtuse and equal to an angle formed between the axes of the first and the third elongate arms.

8. The multipoint tie-down according to claim 7, wherein an angle formed between the axes of the second and the third elongate arms is approximately 70 degrees.

9. The multipoint tie-down according to claim 1, wherein the central hub is formed with first, second, third and fourth elongate arms and comprises the center point, each of the first, the second, the third and the fourth elongate arms defines an axis and is arranged with respect to the central hub such that the axis of each of the first, the second, the third and the fourth elongate arms passes through the center point, and the first and the third elongate arms are coaxially aligned with each other and the second and the fourth elongate arms are coaxially aligned with each other, and the central hub and the first, the second, the third and the fourth elongate arms are arranged to form a cross-pattern.

10. The multipoint tie-down according to claim 9, wherein the axes of the first and the third elongate arms extend normal to the axes of the second and the fourth elongate arms.

11. The multipoint tie-down according to claim 1, wherein each of the plurality of elongate arms has a remote end that is opposite from the central hub, the remote ends of the plurality of elongate arms each comprises a thru-hole therein that is located centrally in the respective remote end, the thru-holes each receive a galvanized S-hook which couple the multipoint tie-down to a plurality of attachment points on the support system, the remote ends each have a raised border around a perimeter thereof which has a cross sectional thickness that is greater than a cross sectional thickness of the remote end radially within the raised border.

12. The multipoint tie-down according to claim 1, wherein the plurality of elongate arms consists of at least first, second and third elongate arms, the first, the second and the third elongate arms each define a respective axis and are circumferentially spaced about the circular perimeter of the central hub such that the first elongate arm is directly circumferentially adjacent to the second elongate arm and the second elongate arm is directly circumferentially adjacent to the third elongate arm, and an angle formed by the axis of the first elongate arm and the axis of the second elongate arm is smaller than an angle formed by the axis of the second elongate arm and the axis of the third elongate arm.

\* \* \* \* \*